United States Patent [19]

Wakui

[11] Patent Number: 5,499,105
[45] Date of Patent: Mar. 12, 1996

[54] MAXIMIZING THE QUALITY OF A SIGNAL REPRODUCED FROM A RECORDING DISK

[75] Inventor: Yoshio Wakui, Saitama, Japan

[73] Assignee: Asahi Kogaku Kogyo Kabushiki Kaisha, Tokyo, Japan

[21] Appl. No.: 293,196

[22] Filed: Aug. 19, 1994

Related U.S. Application Data

[63] Continuation of Ser. No. 996,004, Dec. 23, 1992, abandoned.

[30] Foreign Application Priority Data

Dec. 24, 1991 [JP] Japan .................................. 3-361253

[51] Int. Cl.$^6$ ........................... H04N 5/781; G11B 5/596; G11B 7/00
[52] U.S. Cl. .................... 358/342; 360/77.06; 369/44.32
[58] Field of Search ............................. 369/44.28, 44.34, 369/44.32, 54, 32; 360/77.04, 77.06, 78.13; 358/335, 342, 310, 906; 348/207; H04N 5/76, 5/78, 5/781, 5/782, 5/783, 9/79, 5/92

[56] References Cited

U.S. PATENT DOCUMENTS

| 4,204,234 | 5/1980 | Noble ................................. 360/77.06 |
| 4,544,872 | 10/1985 | Hirano et al. ...................... 360/77.06 |
| 4,589,023 | 5/1986 | Suzuki et al. . | |
| 4,710,825 | 12/1987 | Okita et al. . | |
| 4,843,496 | 6/1989 | Marchetti .......................... 360/77.04 |
| 4,992,885 | 2/1991 | Yoshio ................................. 358/342 |
| 5,047,869 | 9/1991 | Aoki et al. . | |
| 5,073,835 | 12/1991 | Sano et al. ......................... 360/77.04 |
| 5,097,365 | 3/1992 | Takahashi .......................... 360/77.06 |
| 5,166,806 | 11/1992 | Ebisawa et al. ..................... 358/342 |
| 5,255,102 | 10/1993 | Fushiki ................................ 358/342 |
| 5,339,199 | 8/1994 | Ogawa . | |

Primary Examiner—Thai Q. Tran
Attorney, Agent, or Firm—Sandler, Greenblum & Bernstein

[57] ABSTRACT

A video signal reproducing device for reproducing a video signal recorded on a track of a magnetic disk. The track on the magnetic disk is divided into a plurality of portions along a rotational direction of the magnetic disk. An auto-tracking operation is executed with respect to each of the plurality of portions and the video signal recorded therein is read out.

20 Claims, 7 Drawing Sheets

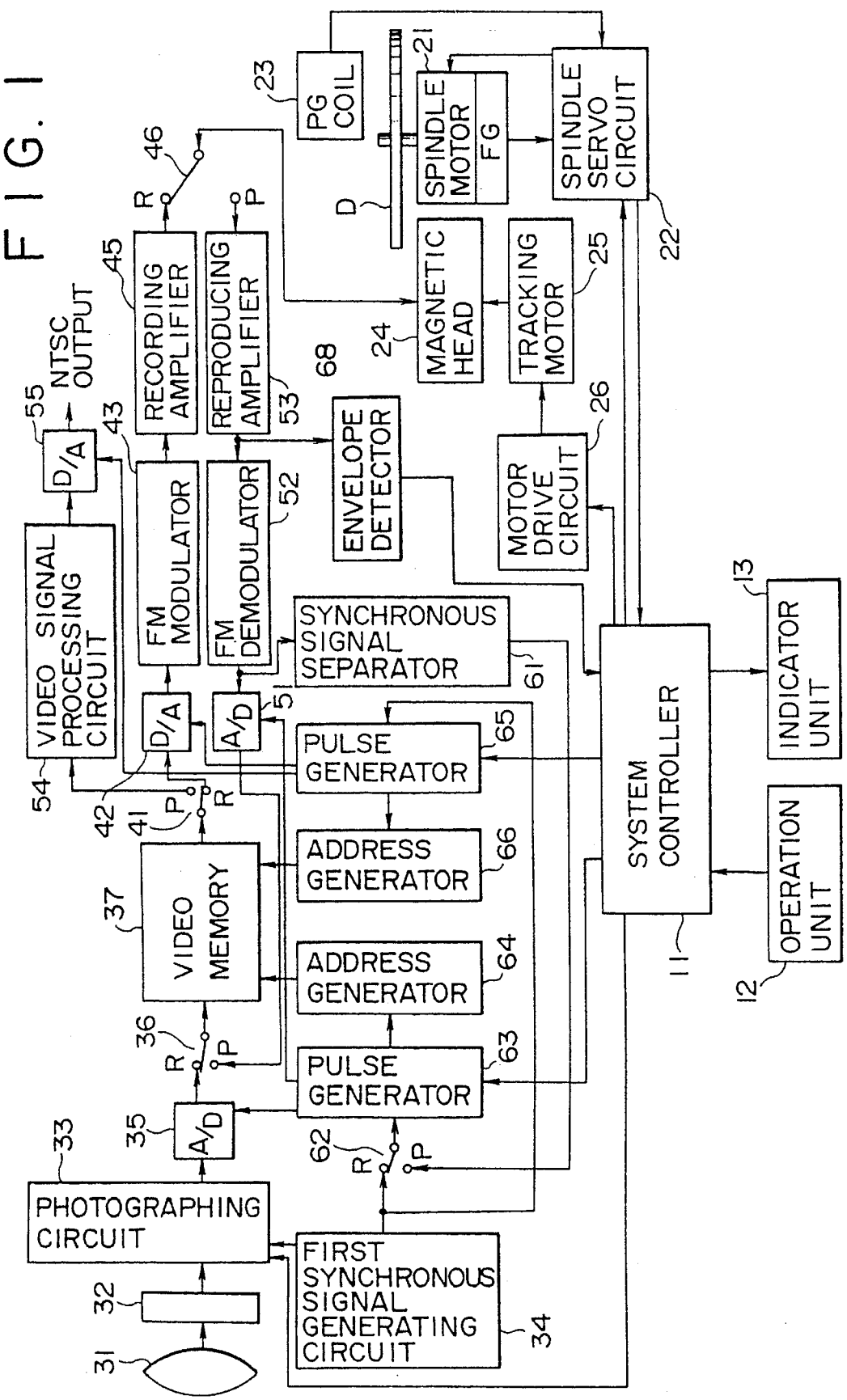

MAXIMIZING THE QUALITY OF A SIGNAL REPRODUCED FROM A RECORDING DISK

This application is a continuation of application Ser. No. 07/996,004, filed Dec. 23, 1992, now abandoned.

BACKGROUND OF THE INVENTION

1. Field of the Invention

The present invention relates to a device reproducing an video signal which has been stored, by an electronic still camera or the like, in a recording medium, such as a magnetic disk.

2. Discussion of Background and Relevant Information

Conventionally, in an electronic still camera, a magnetic disk has been used as the recording medium. In the electronic still camera, the magnetic disk is rotated at a predetermined rotational speed. A head member is positioned at respective tracks of the rotating magnetic disk, and the video signal is recorded on the magnetic disk through the head member.

When the video signal recorded on the magnetic disk is reproduced, the magnetic disk is rotated by a chuck mechanism which is gripped by the chuck mechanism. However, since there is a manufacturing error in the chuck mechanism, the rotational axis of the disk may not coincide with the center of a record track.

If the center of a track of the magnetic disk does not coincide with the center of a locus formed by the head member, in order to reproduce a clear image by reading the video signal, it is necessary to deviate the head so as to follow the record track. The head is, however, moved by means of an electrical actuator, such as a stepping motor. Accordingly, the movement of the magnetic head is slow with respect to the rotation of the magnetic disk. Therefore, it is quite difficult to control the position of the magnetic head in response to the record track. With this respect, conventionally, the magnetic disk should be located at a fixed position even if the center of the recorded track does not coincide with the locus of the head member. Thus, it has been difficult to reproduce the recorded image with high accuracy.

SUMMARY OF THE INVENTION

It is therefore an object of the invention to provide an improved still video reproducing apparatus that is capable of reproducing the recorded video signal with a high accuracy and with a simple construction.

For the above object, according to the present invention, there is provided a video signal reproducing device for reproducing a video signal recorded on a track of a magnetic disk, the device comprising:

means for dividing the track on the magnetic disk into a plurality of portions along a rotational direction of the magnetic disk; and means for executing an auto-tracking operation with respect to each of the plurality of portions.

Optionally, the means for executing the auto-tracking operation detects a position at which an amplitude of the video signal recorded in each of the plurality of portions becomes highest.

It can be designed that the video signal reproducing device further comprises memory means for storing the video signal read out of the magnetic disk, the video signal recorded in each of the plurality of portions being read out after the auto-tracking operation is executed and stored in a corresponding portion of the memory means.

Further, there is provided means for reading the video signal stored in the memory means, and means for displaying an image in accordance with the video signal read out of the memory means.

According to another aspect of the invention, there is provided a video signal reproducing device for reproducing a video signal recorded on a track of a magnetic disk, the device comprising:

first tracking means for executing an auto-tracking operation over the track on the magnetic disk;

means for detecting the deviation of the amplitude of the video signal read out of the track; and means for dividing the track into a plurality of portions along the rotational direction of the magnetic disk based upon the detected deviation; and second tracking means for executing an auto-tracking operation with respect to each of the plurality of portions.

According to a further aspect of the invention, there is provided a video signal reproducing device for reproducing a video signal recorded on a magnetic disk, the device comprising means for driving the magnetic disk to rotate about its rotational axis, and a head member for reading video signals recorded in tracks on the magnetic disk, the device comprising:

means for dividing a track on the magnetic disk into a plurality of portions along the rotational direction of the magnetic disk;

means for positioning the head member at optimum positions at which an amplitude of the video signal read from respective ones of the portions become greatest;

means for storing video signals read out of the plurality of portions with the head member being positioned at the respective optimum positions; and means for reading the video signal stored in the storing means and outputting the same.

According to an object of the present invention, a video signal reproducing device for reproducing a video signal recorded on a track of a recording disk, comprises:

a head member for reading a video signal recorded on the recording disk;

means for positioning the head member at an optimum position where an average amplitude of the video signal read out of a track of the recording disk becomes highest; and means for varying a position of the head member with respect to the optimum position, when the video signal is read out of the track, in accordance with an amplitude of the video signal read out of the track.

A feature of the present invention resides in the varying means stepwisely varying the position of the head member. The varying means comprises:

means for dividing the track into a plurality of portions along a rotational direction of the recording disk; and means for positioning the head member at positions where an amplitude of the video signal read out of each of the plurality of portions become highest.

Furthermore, the present invention envisions that the video signal read out of each of the plurality of portions is stored.

An advantage of the present invention is that the varying means comprises means for comparing the amplitude of the video signal read out of the track with a predetermined threshold value, in which the threshold value comprises an average amplitude of the video signal read out of the track. The varying means changes the position of the head member in accordance with the comparison of the comparing means.

Another advantage of the present invention is that the varying means divides the track into a plurality of portions along a rotational direction of the recording disk in accordance with the comparison of the comparing means, the head member being repositioned for each of the plurality of portions.

DESCRIPTION OF THE ACCOMPANYING DRAWINGS

FIG. 1 shows a control circuit in an electronic still camera embodying the present invention;

DESCRIPTION OF THE EMBODIMENTS

Figure 2A:
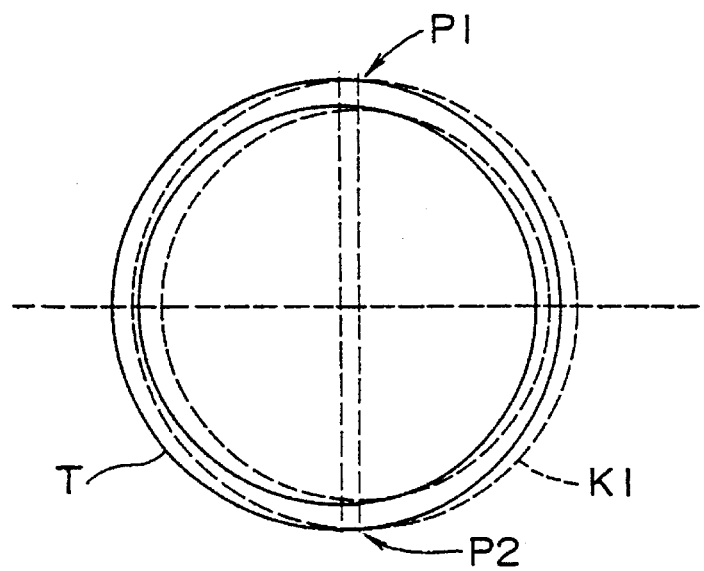
FIGS. 2A through 2C show the relation of a track and a locus of a head member.

FIG. 1 shows a control circuit in an electronic still camera embodying the present invention.

A system controller 11 is a well-know micro-computer including a CPU (Central Processing Unit), ROM (Read Only Memory), and RAM (Random Access Memory), etc. The system controller 11 controls the entire system of the electronic still camera. To the system controller 11, an operation unit 12 is provided with various operation switches, and a display unit for displaying information relating to the operation status, etc. of the electronic still camera.

A magnetic disk D is driven to rotate by a spindle motor 21. A PG coil 23 detects the rotation of the magnetic disk D and outputs a predetermined detection signal to the spindle servo circuit 22 at each revolution of the magnetic disk D. The system controller 11 controls a spindle servo circuit 22 so that the spindle motor 21 revolves at a predetermined revolution speed, e.g., 3600 rpm (revolutions per minute). A tracking motor 25, which is a stepping motor, controls a magnetic head 24 to move in a radial direction of the magnetic disk D. The tracking motor 25 is controlled by the system controller 11 through a tracking motor drive circuit 26. Thus, while the magnetic disk D is rotating, the magnetic head 24 is located at a position corresponding to a certain track, and records/reads the video signal and/or ID code onto/from the magnetic disk 24.

An object image is focused onto a light receiving portion (not shown) of a CCD (Charge Coupled Device) 32 through an aperture (not shown) and a lens 31. The CCD 32 is connected to a photographing circuit 33, which read a video signal from the CCD 32. For the purpose of controlling the CCD 32 and the photographing circuit 33, a synchronous signal generator 34 applies horizontal and vertical synchronous signals to the photographing circuit 33. In the photographing circuit 33, the video signal is separated into a color difference signal and a brightness signal. It is to be noted that the color difference signal is a signal in which two color difference signals (R−Y, and B−Y) are alternately arranged, each having a period of 1H (horizontal scanning period). The color difference signal and brightness signal are transmitted from the photographing circuit 33 to an A/D (analog-to-digital) converter 35.

The A/D converter 35 is connected to a video memory by way of a switch 36. The video memory has a capacity for storing at least one frame of the image signal. The switch 36 is turned to the A/D converter 35 side (R side in the figure) when the video signal is recorded, while it is turned to an A/D converter 51 side (P side in the figure) when the video signal is reproduced.

The video memory 37 is also connected to a D/A (digital-to-analog) converter 42 by way of a switch 41, the D/A converter 42 being connected with an FM (Frequency Modulation) modulator 43. The FM modulator 43 is connected to a recording amplifier 45 which is connected to the magnetic head 24 through a switch 46.

When the video signal is recorded, the switch 41 is turned to the D/A converter 42 side (R side in the figure), and switch 46 is turned to the recording amplifier 46 side (R side in the figure). Thus, the video signal stored in the video memory 37 is digital-to-analog converted, frequency-modulated, then amplified by the recording amplifier 45, and recorded on a certain track of the magnetic disk D through the magnetic head 24.

Further, the video memory 37 is connected to the A/D converter 51 through the switch 36, the A/D converter 51 connected with a FM demodulating circuit 52. The FM demodulator 52 is connected with a reproducing amplifier 53 which is connected with the magnetic head 24 through the switch 46.

When the video signal is reproduced, switch 36 is turned to the A/D converter side 51 (P side in the figure), and switch 46 is turned to the reproducing amplifier 53 (P side in the figure). Thus, the video signal is read out of the video memory 37, a predetermined process is applied thereto, digital-to-analog converted, and outputted to a displaying device, or the like, in the form of, for example, a NTSC signal.

The synchronous signal separator 61 separates the horizontal and vertical synchronous signals out of the video signal which is outputted from the FM demodulator 52. The synchronous signal separator 61 is connected with a sampling pulse generator 63 through the switch 62, which is also connected with the synchronous signal generator 34. The switch 62 is turned to the synchronous signal generator 34 side (R side in the figure) when the video signal is recorded, while it is turned to the synchronous signal separator 61 side (P side in the figure) when the video signal is reproduced.

The sampling pulse generator 63 generates the sampling pulse based upon the horizontal and vertical synchronous signals outputted from the synchronous signal separator or the synchronous signal generator 34. Then, the sampling pulse generator 63 outputs the sampling pulse to the A/D converters 34 and 51, and an address generator 64. The A/D converters 35 and 51 convert the video signal from analog to digital synchronously with the sampling pulse. The address generator 64 generates the address of the video memory for storing the video signal synchronously with the inputted sampling pulse.

When the video signal is reproduced, switch 36 is turned to the A/D converter 51 side (P side in the figure), and switch 62 is turned to the synchronous signal separator 61 side (P side in the figure). Thus, the signal read out of the magnetic disk D is converted from analog to digital by the A/D converter 51 synchronously with the sampling pulse which is generated by the sampling pulse generator 63. It should be noted that, in the above case, the sampling pulse generator 63 generates the sampling pulse based upon the output of the synchronous signal separator 61. Then, the video signal is stored in the video memory 37 at the address generated by the address generator 64. The address generator 64 also generates the address in accordance with the output of the synchronous signal separator 61.

In addition to the above basic construction, in the present embodiment, there is provided an envelope detector 68. The envelope detector 68 is used to obtain a high S/N ratio in reproducing the video signal in order to regenerate a clear and fine image. The envelope detector 68 is provided between the reproducing amplifier 53 and the system controller 11. The envelope detector 68 detects the envelope waveform from the video signal which is outputted by the reproducing amplifier 53. Then, the envelope detector 68 outputs an envelope signal representing the envelope waveform to the system controller 11. The envelope detector 68 is so designed that the output signal from the envelope detector 68 represents a variation of the video signal read out of the magnetic disk D. The system controller 11 controls the positioning of the magnetic head 24 in accordance with the envelope signal. This control is a so-called auto-tracking control over a track. The switching operation of switches 36, 41, 46 and 62 are performed by the system controller 11.

Figure 2B:
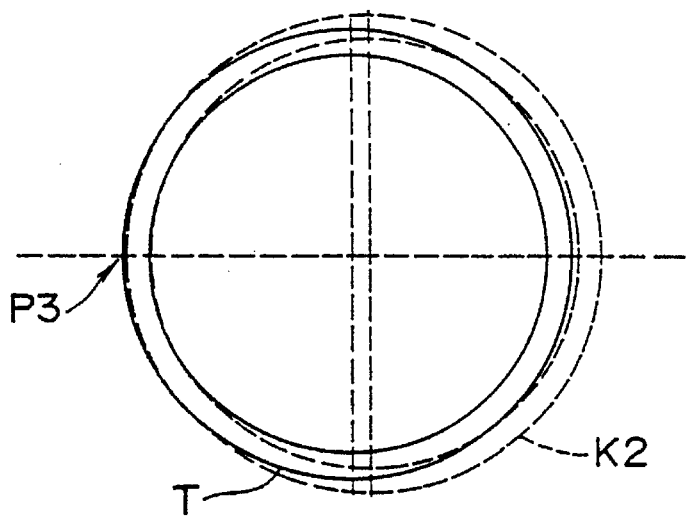
Figure 2C:
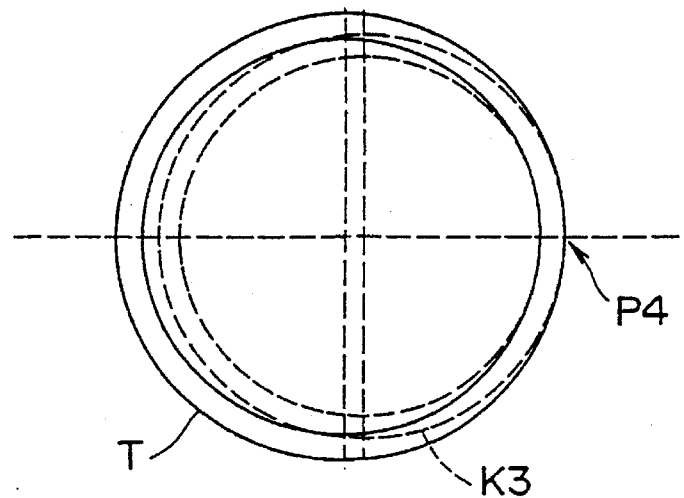

FIGS. 2A through 2C show a recorded track T, and locusi K1 through K3 of the magnetic head 24 formed on the magnetic disk D. Note that the locusi K1 through K3 are formed by the relative movement of the magnetic disk D and the magnetic head 24.

FIGS. 2A through 2C correspond, respectively, to three different positions of the magnetic head 24. In FIG. 2A, locus K1 substantially corresponds to track T. In FIG. 2B, locus K2 is relatively outside track T. In FIG. 2C, locus K3 is relatively inside track T. In each case, the center of the locus is shifted with respect to the center of the track T on the right hand side of the figure.

In FIG. 2A, track T and locus K1 substantially overlap at portions P1 and P2. Thus, the video signal recorded at portions P1 and P2 can be read out with high accuracy. In FIG. 2B, track T and locus K2 substantially overlap at a portion P3. Thus, only the video signal on the left hand side portion of track T in the figure (i.e., portion P3) can be exactly read out. In FIG. 2C, track T and locus K3 substantially overlap at a portion P4. Thus, the video signal can be exactly read out only with respect to the right hand side portion of track T in the figure (i.e., portion P4).

In the embodiment, track T is divided into a plurality of blocks along the circumferential direction of track T. Then, the video signal stored in the divided blocks is read out after moving the magnetic head 24 to respective optimum positions, in which the amplitude of the video signal read out of the respective blocks become maximum.

Figure 3:
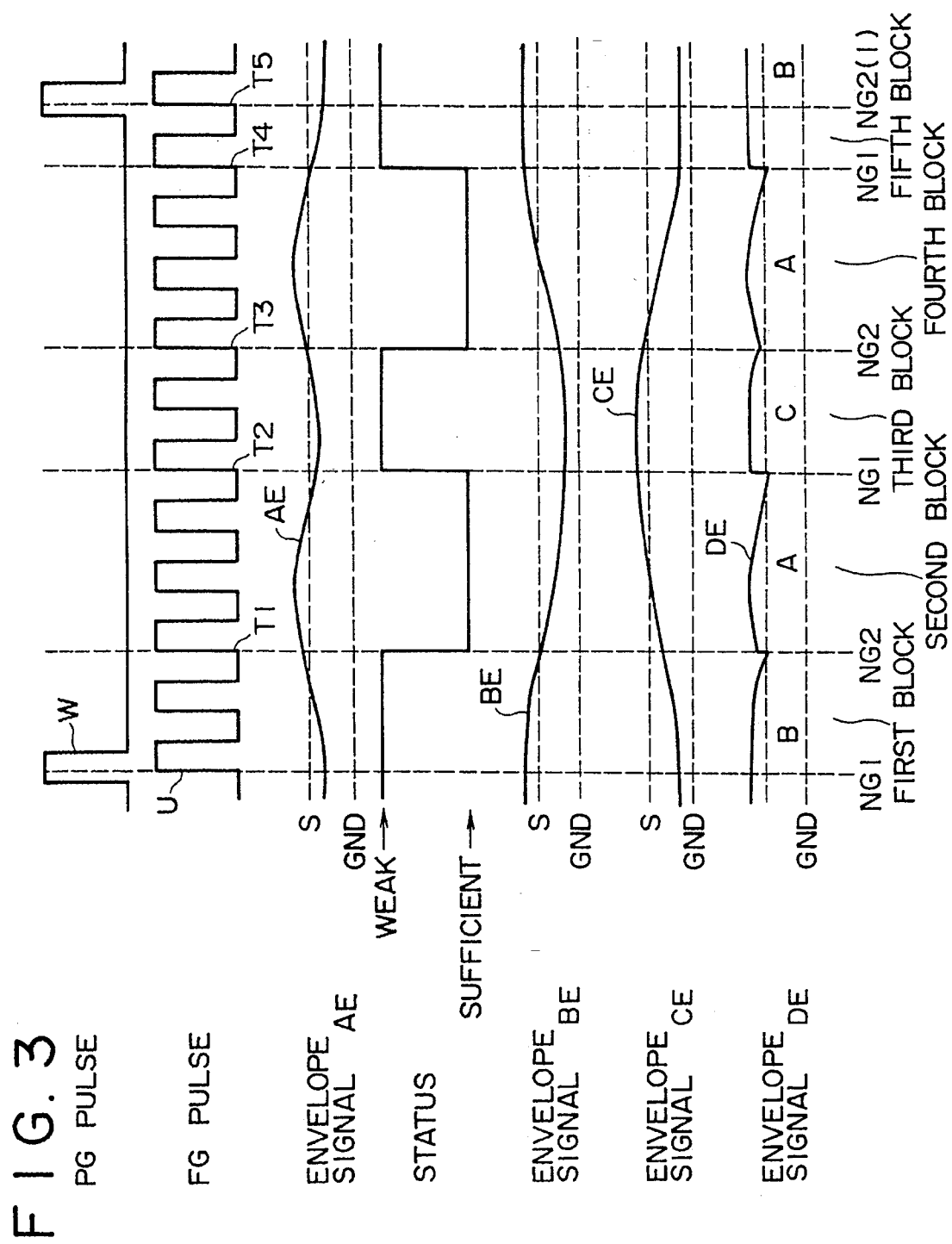
FIG. 3 is a timing chart showing the relation of signals.

FIG. 3 is a timing chart showing the envelope waveform, i.e., the variation of the read video signal obtained in accordance with the present invention.

In FIG. 3, the PG pulse is a pulse W outputted by the PG coil 23 at every revolution of the magnetic disk D. The FG pulse signal includes a pulse U that is outputted by the spindle motor 21 in accordance with the rotational speed thereof. The FG pulse signal includes, for example, 11 pulses U within one period, defined as being between two successive PG pulses W, i.e., within one revolution of the magnetic disk D. The video signal for one image frame is recorded on one track of the magnetic disk D. The video signal is recorded with respect to the PG pulse.

An envelope signal AE corresponds to the relation of track T and locus K1 of FIG. 2A. The position of the magnetic head 24 in FIG. 2A is determined such that the average value of the envelope signal AE during the one revolution of the magnetic disk D becomes highest. Hereinafter, this average value of the envelope signal AE is referred to as a threshold value S. The track T is divided into five blocks, as shown in FIG. 3, at positions T1 through T4, where pulses U rise up after the envelope signal AE crosses the threshold value S. The end of the fifth block (i.e., the beginning of the first block) corresponds to the rise-up of the pulse W.

With respect to the waveform of the envelope signal AE, the amplitude thereof is lower than the threshold value S in the first block. That is, in the first block, the envelope signal is too weak to reproduce a sufficient video signal. After the second FG pulse U is outputted, the envelope signal AE becomes greater than the threshold value S. Thus, a second block, in which the reproduced video signal would be sufficiently strong, starts from T1 when the third FG pulse rises up as shown in FIG. 3. After the third FG pulse in the second block, the envelope signal becomes lower than the threshold value S. Thus, the third block starts at T2, at which the succeeding FG pulse rises up. Similarly, a fourth block starts at time T3, and at time T4, the third block ends and a fifth block starts. The fifth block ends at the rise-up of an FG pulse which is generated 7H (horizontal synchronous period) after the PG pulse has been generated.

When the positional relation of track T and the locus of the magnetic head 24 is as shown in FIG. 2B, outputted envelope signal BE differs from the envelope signal AE. As shown in FIG. 3, envelope signal BE has a value higher than the threshold value S in the first and fifth blocks, and lower than the threshold value S in the other blocks.

When the positional relation of track T and the locus of the magnetic head 24 is as shown in FIG. 2C, outputted envelope signal CE also differs from the envelope signal AE. As shown in FIG. 3, envelope signal CE has a value higher than the threshold value S in the third block, and lower than the threshold value S in the other blocks.

Accordingly, if the magnetic head 24 is adjusted such that the locus thereof becomes K2 in the first and fifth blocks, the locus becomes K3 in the third block, and the locus becomes K1 in the second and fourth blocks, a relatively stronger envelope signal can be obtained through the entire track T. Thus, a sufficiently high S/N ratio of the video signal can be obtained along the entire track of the magnetic disk. Accordingly, it becomes possible to display a fine and clear image on a displaying device and the like.

Figure 4:
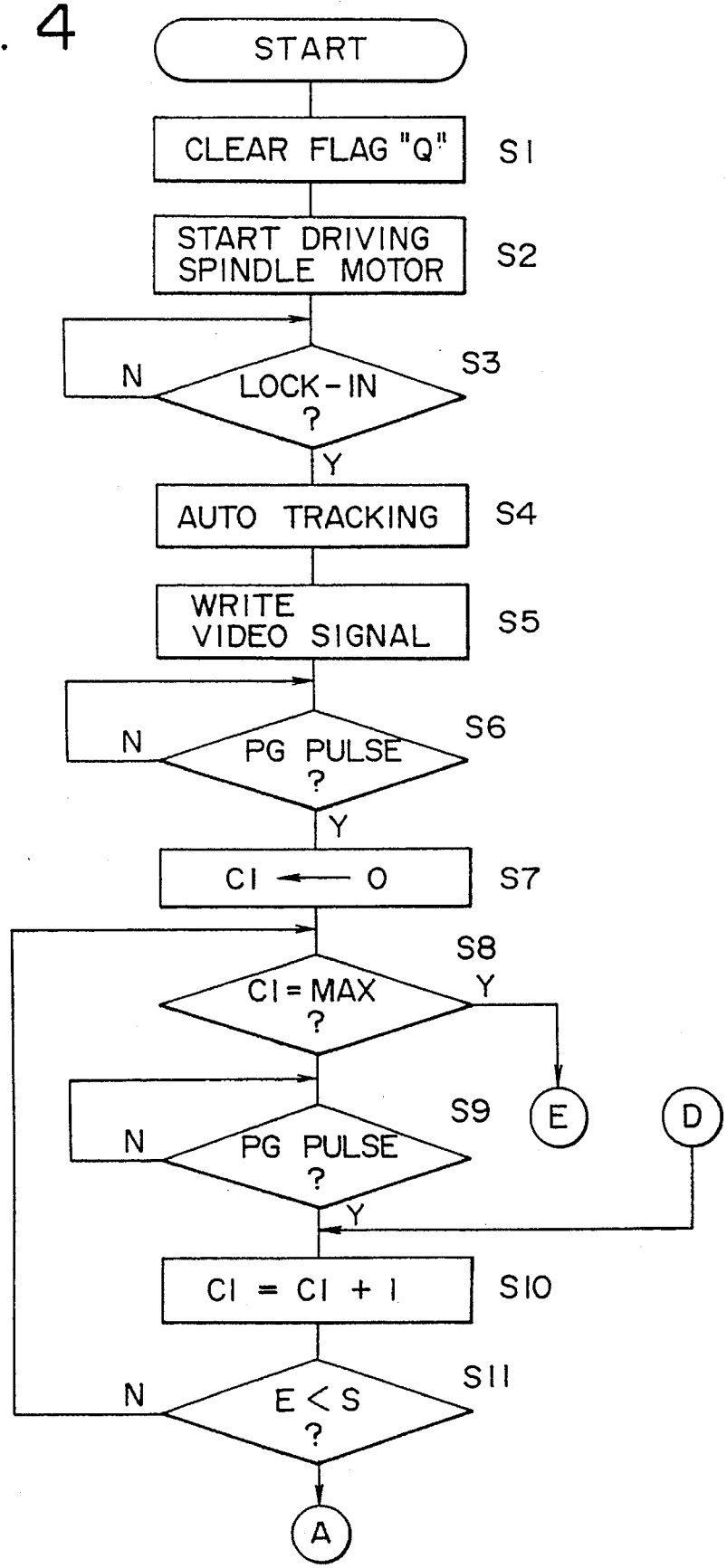
FIGS. 4 through 7 show a flowchart illustrating control of the electronic still camera according to the present invention.
Figure 5:
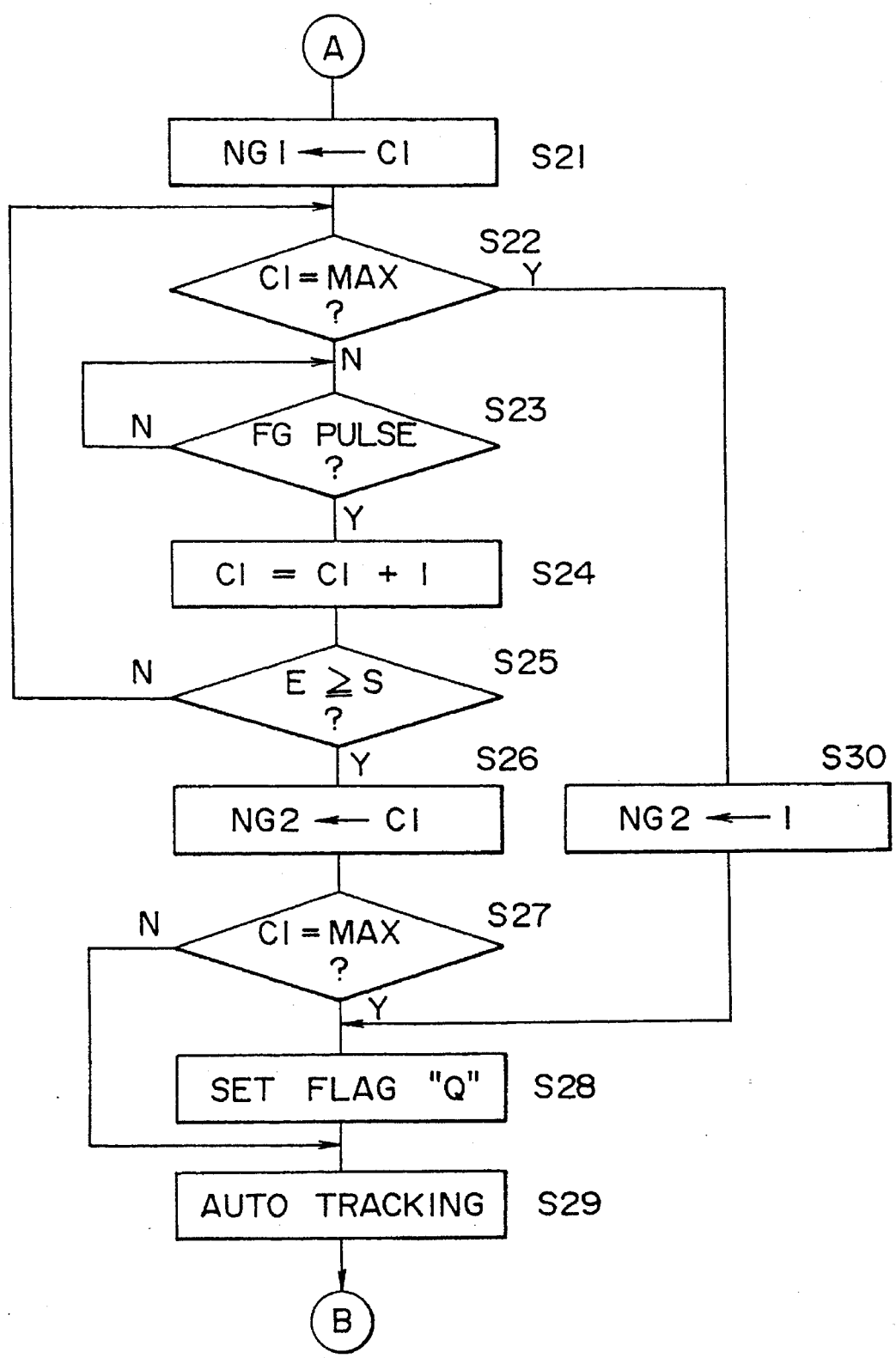
Figure 6:
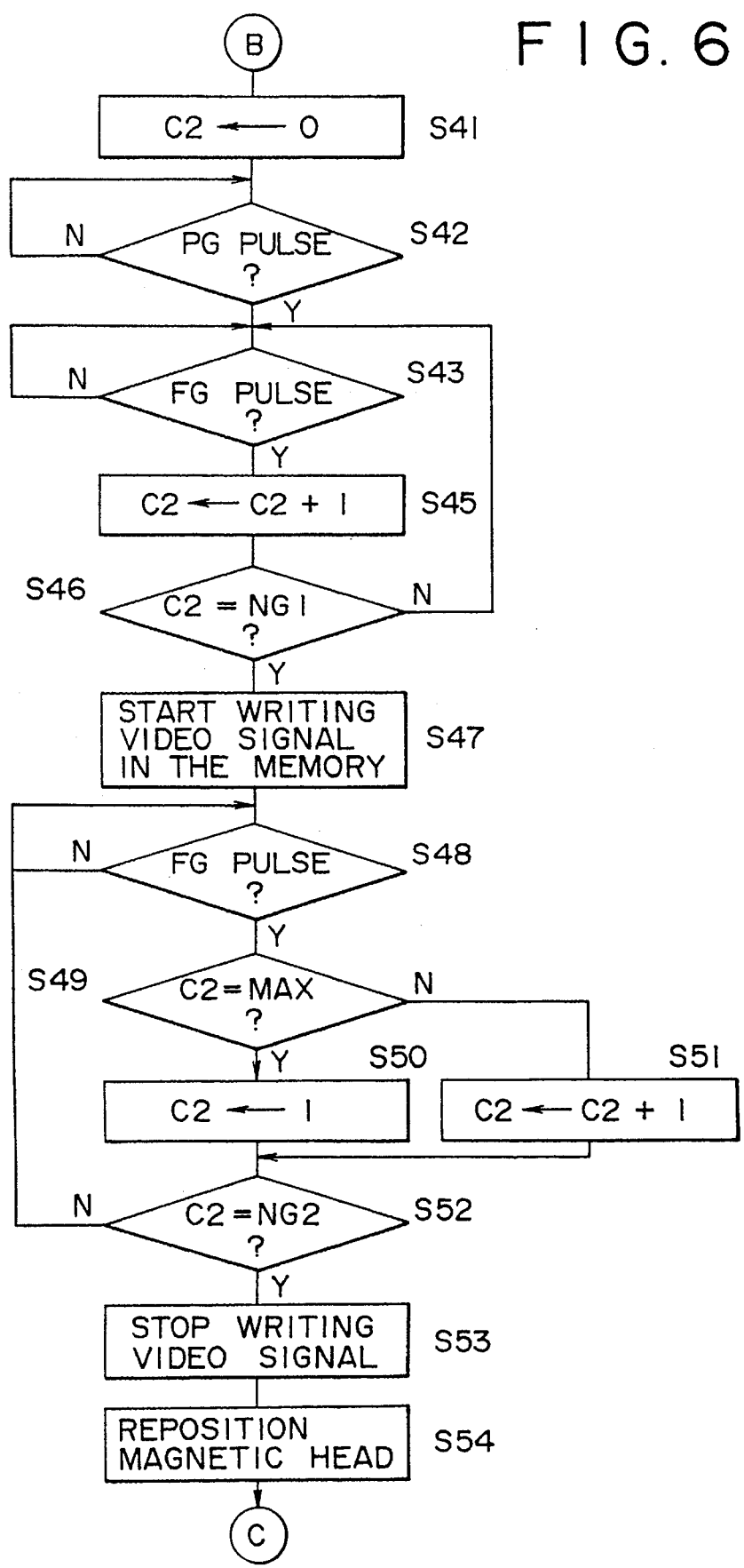
Figure 7:
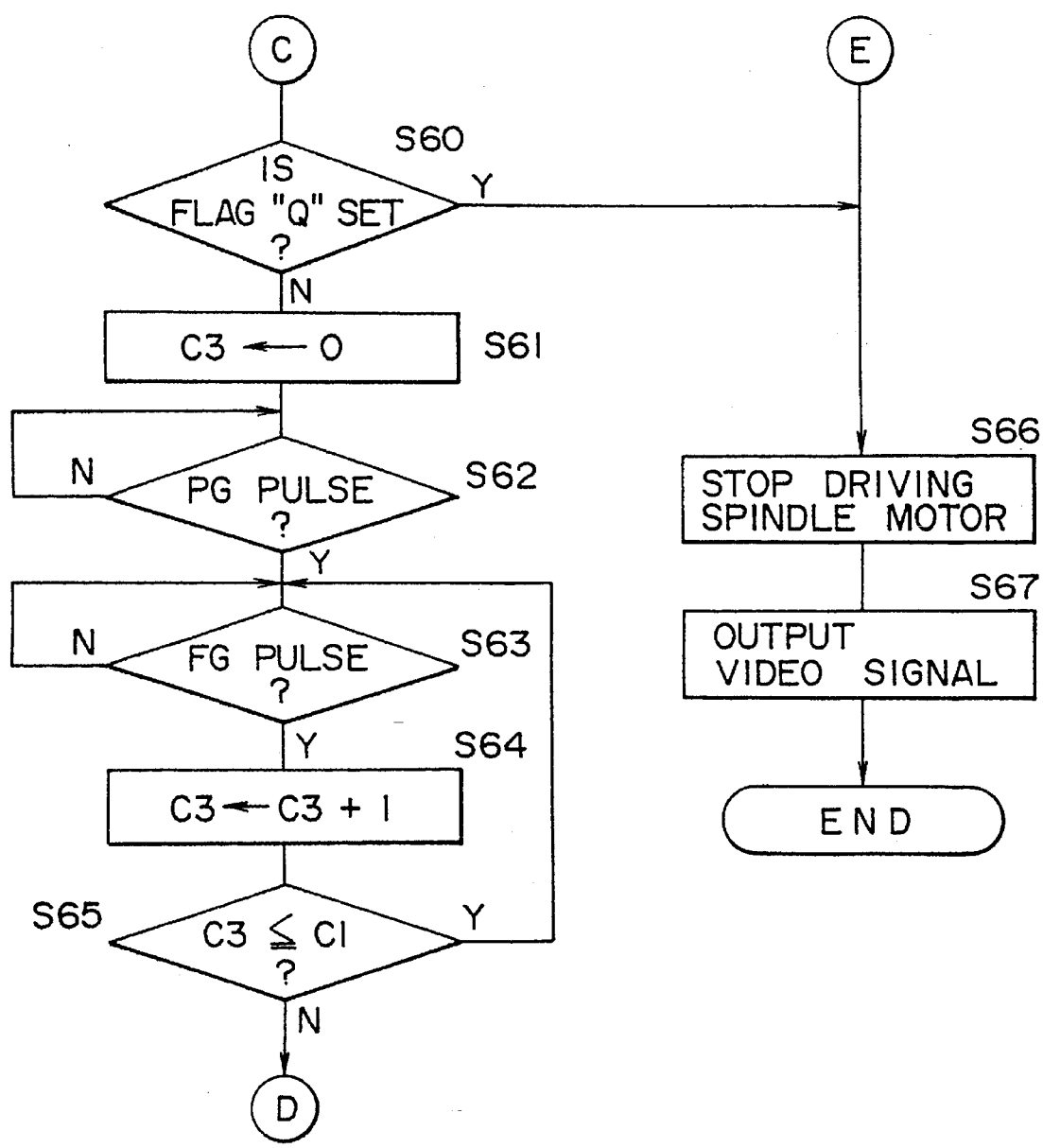

FIGS. 4 and 5 are flowcharts illustrating the positional control of the magnetic head 24.

When reproducing the video signal is started, a flag "Q", indicating whether the reading operation is finished, is cleared (in step S1), and the spindle motor 21 is started to rotate (in step S2). When the rotation of the spindle motor 21 reaches a steady state (a lock-in state), i.e., it is discriminated that the spindle motor 21 is rotating at a predetermined constant speed (Yes in step S3), an auto-tracking over the entire track is executed (in step S4). In step S4, the position of the magnetic head is adjusted so that the average amplitude of the envelope signal along the entire track of the magnetic disk D becomes its possibly highest value.

The auto-tracking operation is executed as follows: The magnetic head 24 is initially located at a certain position, and the envelope signal is detected. Maximum and minimum values of the envelope signal are obtained, and an average value is calculated. The magnetic head 24 is then shifted by a predetermined amount, and the envelope signal is detected for the new position. Maximum and minimum values of the envelope signal at this new position are obtained, as above, and an average value at this new position is calculated. The above two calculated average values are then compared, and the magnetic head 24 is moved to the position where the average value is greater. Similar operations are performed with respect to changing the position of the magnetic head 24, so that the magnetic head 24 is finally located at the position where the average value is highest.

After this tracking operation has been executed, the locus of the magnetic head 21 becomes as the locus K1 in FIG. 2A. As mentioned above, this average amplitude is hereinafter referred to as the threshold value S. After the adjustment of the magnetic head 21 has been executed, the video signal is read out of the magnetic disk D, and is stored in the video memory 37 (in step S5).

When the PG pulse is generated, count value C1 of a first counter in the system controller 11 is reset, i.e., set to 0 (in steps S6 and S7). It is to be noted that the count value C1 indicates the number of pulses having been generated since the PG pulse W was generated. Until C1 reaches the maximum value MAX, which is the number of FG pulses to be generated during one cycle, the count value C1 is incremented by one at each generation of the FG pulse (in steps S8, S9 and S10). Steps S8, S9 and S10 are repeatedly executed while the amplitude of envelope signal E is lower than the threshold value S (in step S11). If it is discriminated that C1 reaches the maximum value MAX at step S8, the spindle motor 21 is stopped, and the output of the video signal is executed.

When the envelope signal E becomes less than the threshold value S (Yes in step S11), a value NG1 is set with the count value C1 (in step S21). Unless the count value C1 equals the maximum value MAX, the FG pulse is counted by the count value C1 and the amplitude of the envelope signal E is compared with the threshold value S (in steps S22 through S25).

If the envelope signal E becomes greater than or equal to the threshold value S (Yes in step S25), value NG2 is set to the count value C1 (in step S26). With the above process, the beginning and end of a period within which the envelope signal is lower than the threshold value are identified by the value NG1 and NG2, respectively. If, in step S22, it is discriminated that the count value C1 equals the maximum value MAX, the value NG2 is set to "1" (step S30), and then flag "Q" is set (in step S28).

If (in step S30) it is discriminated that the count value C1 equals the maximum value MAX, flag "Q" is set. If not, (No in step S27), step S28 is skipped, i.e., flag "Q" is not set.

In step S29, the auto-tracking is executed. In this step, the magnetic head 24 is moved to a position at which the amplitude of the envelope signal E within the block defined between NG1 and NG2 becomes the greatest If NG2="1", the block is defined as NG1 and the first FG pulse after a succeeding PG pulse has been generated, and the above-described auto-tracking is executed with respect to the thus defined block.

After the auto tracking has been completed, with the use of the count value C2 which is counted by a second counter of the control system 11, the FG pulses are counted until C2 equals NG1 (in steps S41 through S46). When the count value C2 equals NG1, the video signal is read out of the magnetic disk D, and overwritten in the video memory 37 (from step S47) at the portion corresponding to the read block. While the video signal is read/written, the FG pulses are counted. If the count value reaches the end of the block, (i.e., if C2=NG2), the reading/writing operation is stopped (in step S53), and the magnetic head is moved to the previous position at which the average amplitude of the envelope signal over the entire track is the greatest (in step S54). Since the tracking motor 25 is a stepping motor, the magnetic head can be repositioned at the previous position only by referring to the number of pulses which is stored in a memory in the control system 11.

If flag "Q" has been set, the spindle motor 21 is stopped, and the output of the video signal is started.

If flag "Q" has not yet been set in step S60, with the use of a count value which is counted by a third counter in the control system 11, the FG pulses are counted until C3 becomes greater than C1. Then, the process goes to step S10.

As described above, according to the present invention, a track on which a video signal is recorded is divided into a plurality of blocks, and the video signals on the divided blocks are read out with locating the magnetic head at the optimum positions for each track. Therefore, even if the center of the recorded track of the magnetic disk is different from the rotary center of the magnetic disk, it is possible to trace the recorded track, and thus, a clear image can be obtained.

The present disclosure relates to subject matter contained in Japanese Patent Application No. HEI 3-361253, filed on Dec. 24, 1991, which is expressly incorporated herein by reference in its entirety.

What is claimed is:

1. A method for reproducing a video signal from a recording medium having a plurality of concentric tracks formed thereon, in which the video signal is recorded on at least one of the plurality of concentric tracks of the recording medium, comprising the steps of:

positioning a head member at a predetermined position of a predetermined concentric track containing the recorded video signal so that an envelope of the recorded video signal is maximized;

reading the predetermined concentric track to reproduce the video signal recorded on the predetermined concentric track;

storing data corresponding to the reproduced video signal read from the predetermined concentric track in a memory;

obtaining a threshold value based upon the envelope of the recorded video signal;

determining portions of the predetermined concentric track to re-read, based upon the envelope of the recorded video signal and the threshold value; and performing at least one re-read operation of the predetermined concentric track by re-positioning the head member at another predetermined position of the predetermined concentric track to maximize an envelope of at least one portion of the predetermined concentric track that is to be re-read, re-reading the at least one portion of the predetermined concentric track, and replacing a portion of the data corresponding to the reproduced video signal stored in the memory with another data portion obtained by the re-read operation.

2. A method for reproducing a video signal from a recording medium having a plurality of concentric tracks formed thereon, in which the video signal is recorded on at least one of the plurality of concentric tracks of the recording medium, comprising the steps of:

positioning a head member at a predetermined position of a predetermined concentric track containing the recorded video signal so that an envelope of the recorded video signal is maximized;

reading the predetermined concentric track to reproduce the video signal recorded on the predetermined concentric track;

storing data corresponding to the reproduced video signal read from the predetermined concentric track in a memory;

obtaining a threshold value based upon the envelope of the recorded video signal;

determining portions of the predetermined concentric track to re-read, based upon the envelope of the recorded video signal; and performing at least one re-read operation of the predetermined concentric track by re-positioning the head member at another predetermined position of the predetermined concentric track to maximize an envelope of at least one portion of the predetermined concentric track that is to be re-read, re-reading the at least one portion of the predetermined concentric track, and replacing a portion of the data corresponding to the reproduced video signal stored in the memory with another data portion obtained by the re-read operation.

3. The method of claim 2, wherein the determining step comprises the step of comparing an amplitude of the envelope of the recorded video signal with the threshold value.

4. The method of claim 3, wherein the step of comparing further comprises the step of determining which portions of the reproduced video signal are lower than the threshold value.

5. The method of claim 2, wherein the step of re-positioning the head member at another predetermined position of the predetermined concentric track comprises the step of stepwisely varying a position of the head member.

6. The method of claim 2, wherein the recording medium comprises a magnetic disk.

7. The method of claim 2, further comprising the step of outputting the data stored in the memory to display an image.

8. An apparatus for reproducing a signal recorded on at least one concentric track of a plurality of concentric tracks of a recording medium, comprising:

a head member that is positioned at a predetermined position of a predetermined concentric track containing said recorded signal so that an envelope of said signal read by said head member is maximized;

a memory that stores data corresponding to said signal read from said predetermined concentric track;

an envelope detector that detects an envelope waveform signal of said signal read from said predetermined position; and a controller that controls said positioning of said head member in accordance with said envelope waveform signal, said controller comparing said envelope waveform signal to a threshold value to determine whether portions of said predetermined concentric track should be re-read, said controller initiating at least one re-read operation of said predetermined concentric track by re-positioning said head member at another predetermined position of said predetermined concentric track to maximize said envelope waveform signal of at least one portion of said predetermined concentric track that is re-read, and replacing a portion of said data stored in said memory with data obtained by said re-read operation.

9. The apparatus of claim 8, further comprising a processor that processes said data stored in said memory after said envelope waveform signal has been maximized for all portions of said predetermined concentric track and outputs a video signal that represents an image recorded to said recording medium.

10. The apparatus of claim 8, wherein said comparison of said envelope waveform signal to said threshold value by said controller is performed by comparing an amplitude of said envelope waveform signal to said threshold value to determine which portions of said signal read from said predetermined position of said predetermined concentric track are lower than said threshold value.

11. The apparatus of claim 10, wherein said controller initiates said at least one re-read operation when said envelope waveform signal is lower than said threshold value.

12. The apparatus of claim 8, wherein said recording medium comprises a magnetic disk and said head member comprises a magnetic head.

13. The apparatus of claim 8, further comprising a tracking motor that positions said head member at various positions of said recording medium.

14. A method for reproducing a signal recorded on at least one track of a plurality of tracks of a storage medium, comprising the steps of:

(a) positioning a head member at a predetermined track of the storage medium containing the recorded signal, the head member being positioned so as to maximize an envelope of at least a portion of the recorded signal to enable at least the portion of the recorded signal to be reproduced;

(b) storing the reproduced recorded signal in a memory;

(c) comparing an amplitude of the envelope with a threshold value to determine which portions of the recorded signal should be re-read; and (d) repeating steps (a) to (c) for remaining portions of the recorded signal for which envelopes are not maximized, portions of the reproduced recorded signal stored in the memory being replaced with new portions in which the envelope is maximized, until an envelope for all portions of the reproduced recorded signal are maximized.

15. The method of claim 14, wherein the storage medium comprises a magnetic disk.

16. The method of claim 14, further comprising the step of outputting the contents of the memory after the envelope for all portions of the reproduced recorded signal are maximized.

17. The method of claim 14, further comprising the step of outputting the contents of the memory after the envelope for all portions of the reproduced recorded signal are maximized in order to display a video image.

18. The method of claim 14, wherein the comparing step comprises the step of determining which portions of the recorded signal should be re-read by determining which portions of the recorded signal are lower than a predetermined threshold value.

19. The method of claim 14, wherein the positioning step comprises stepwisely positioning the head member.

20. The method of claim 14, said head member comprising a magnetic head and said storage medium comprising a magnetic disk having a plurality of concentric tracks, wherein said positioning step comprises the step of positioning said magnetic head at a predetermined concentric track of said magnetic disk containing the recorded signal.

* * * * *